United States Patent

Eger et al.

(10) Patent No.: US 9,929,993 B2
(45) Date of Patent: Mar. 27, 2018

(54) METHOD FOR TRANSMITTING MESSAGES IN AN ENERGY AUTOMATION NETWORK, ENERGY AUTOMATION COMPONENT AND SUBSTATION

(71) Applicant: Siemens Aktiengesellschaft, Munich (DE)

(72) Inventors: Kolja Eger, Wedemark (DE); Reinhard Frank, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/303,093

(22) PCT Filed: Mar. 11, 2015

(86) PCT No.: PCT/EP2015/055079
§ 371 (c)(1),
(2) Date: Oct. 10, 2016

(87) PCT Pub. No.: WO2015/154933
PCT Pub. Date: Oct. 15, 2015

(65) Prior Publication Data
US 2017/0041269 A1    Feb. 9, 2017

(30) Foreign Application Priority Data

Apr. 10, 2014  (DE) .................. 10 2014 206 946

(51) Int. Cl.
*H04L 12/58*  (2006.01)
*H02J 13/00*  (2006.01)
(Continued)

(52) U.S. Cl.
CPC .......... *H04L 51/14* (2013.01); *H02J 13/0013* (2013.01); *H04L 49/201* (2013.01);
(Continued)

(58) Field of Classification Search
CPC ..... H04L 51/14; H04L 49/201; H02J 13/0013
See application file for complete search history.

(56) References Cited

FOREIGN PATENT DOCUMENTS

| WO | 2014/032688 A1 | 3/2014 | ............. H04L 12/28 |
| WO | WO 2014032688 A1 * | 3/2014 | ............. H04L 12/413 |
| WO | 2015/154933 A1 | 10/2015 | ............. H02J 13/00 |

OTHER PUBLICATIONS

Skendzic, Veselin et al., "Enhancing Power System Automation through the Use of Real-Time Ethernet," Power Systems Conference: Advanced Metering, Protection, Control Communication, and Distributed Resources, pp. 480-495, 2006.
(Continued)

*Primary Examiner* — Siming Liu
(74) *Attorney, Agent, or Firm* — Slayden Grubert Beard PLLC

(57) ABSTRACT

A method for communication in an energy automation network having a number of substations, each including energy automation component(s) and an internal communication network for message exchange. The communication networks of the substations are interconnected for message exchange via a public network without multicast support. Each energy automation component may include an application for controlling a communication unit, wherein messages according to IEC 61850 can be exchanged between applications of a common group which includes energy automation components of at least two substations. A first application of a particular group of applications transmits a message to second application(s) of the same group via the substation communication network and/or a public network. Tunnels that encapsulate GOOSE messages may be used to allow an overlay network for transmission of GOOSE messages via a public network without multicast support. The logical groupings of applications may therefore define separate, logical communication networks.

14 Claims, 1 Drawing Sheet

(51) Int. Cl.
*H04L 12/931* (2013.01)
*H04L 29/12* (2006.01)
(52) U.S. Cl.
CPC ...... *H04L 61/2592* (2013.01); *H04L 61/6068* (2013.01); *Y02E 60/723* (2013.01); *Y02E 60/7807* (2013.01); *Y04S 10/16* (2013.01); *Y04S 40/12* (2013.01)

(56) References Cited

OTHER PUBLICATIONS

Ward, S. et al., "Inside the Cloud—Network Communications Basics for the Relay Engineer," 61st Annual Conference for Protective Relay Engineers, 13 pages, 2008.
Goraj, M.et al., "IEC 61850 GOOSE Over WiMax for Fast Isolation and Restoration of Faults in Distribution Networks," 21st International Conference on Electricity Distribution, 4 pages, Jun. 6, 2011.
"IEC/TR 61850-90-5," Technical Report, 12 pages, 2012.
International Search Report and Written Opinion, Application No. PCT/EP2015/055079, 17 pages, dated May 21, 2015.

* cited by examiner

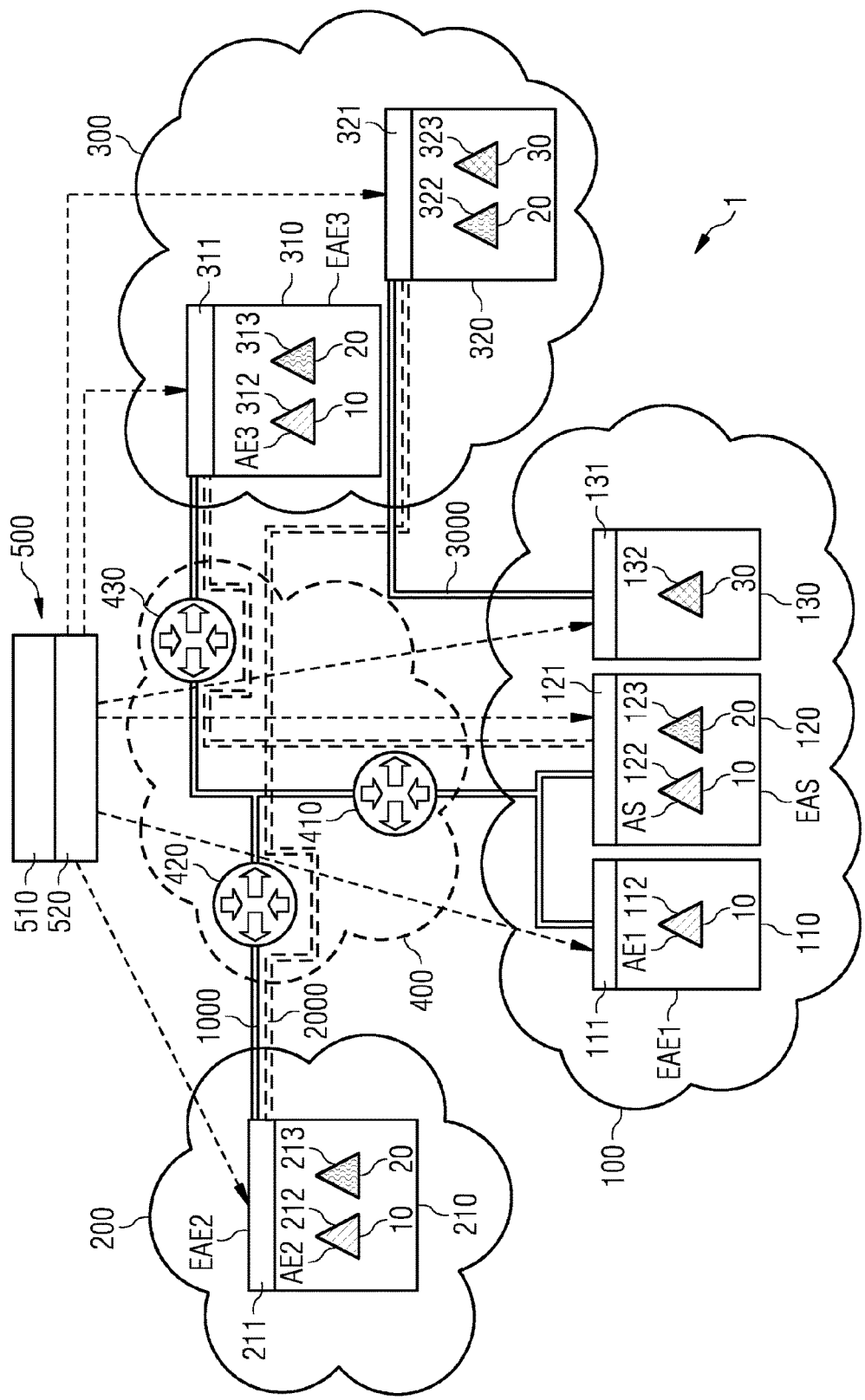

METHOD FOR TRANSMITTING MESSAGES IN AN ENERGY AUTOMATION NETWORK, ENERGY AUTOMATION COMPONENT AND SUBSTATION

CROSS-REFERENCE TO RELATED APPLICATIONS

This application is a U.S. National Stage Application of international Application No. PCT/EP2015/055079 filed Mar. 11, 2015, which designates the United States of America, and claims priority to DE Application No. 10 2014 206 946.7 filed Apr. 10, 2014, the contents of which are hereby incorporated by reference in their entirety.

TECHNICAL FIELD

The invention relates to a method for transmitting messages according to the standard IEC 61850 (GOOSE) in an energy automation network which comprises a number of substations. The invention also relates to energy automation components and to substations for energy automation networks.

BACKGROUND

GOOSE (Generic Object Oriented Substation Events) is a real-time network protocol for controlling devices via Ethernet networks. It is specified in the standard IEC 61850. GOOSE sends messages concerning the state of a device regularly at fixed intervals, for example every second. GOOSE messages are sent by multicast, i.e. a number of receivers can be informed simultaneously about the state of a sender.

A typical application of GOOSE is the spontaneous transmission of changes in state of energy automation components, such as for example the switch position (on/off) of switching devices, or other state messages of the energy automation component to further energy automation components. The energy automation components are connected to one another via Ethernet for exchanging the GOOSE messages. The advantage of controlling the energy automation components via Ethernet as compared with a conventional, direct device-to-device interconnection lies in the free configuration of the devices connected to the network. New cables do not have to be laid for new sending and receiving relationships. The proliferation of Ethernet and the possibility of using Ethernet for further services are reasons for using this technology.

GOOSE messages are accordingly transmitted on layer 2 of the OSI reference model. In this case, a GOOSE message sets the Ethertype field in an Ethernet data packet, whereby a prioritizing of the GOOSE message over other Ethernet messages is possible. The prioritizing has the effect that GOOSE messages are treated with preference over IP packets in the network, so that the delay within the network is as small as possible and the receiver receives GOOSE messages within a time window. This protocol structure allows the real-time capability of GOOSE.

Energy automation networks have a plurality of substations, each of the substations comprising at least one automation component as described above and a generally Ethernet-based communication network, via which the energy automation components can exchange messages according to GOOSE. For controlling the energy automation network, it is sometimes necessary that the state of an energy automation component of a substation is also transmitted to energy automation components in other substations. GOOSE in the original form generally cannot be used for this, since a public network connecting the communication networks (Ethernet) of the substations generally does not have multicast support or only offers this at relatively high costs. The public network, which is typically based on the Internet protocol, is generally a WAN (Wide Area Network), in which the data transmission takes place on layer 3 of the OSI reference model by using routing algorithms.

To be able nevertheless to transfer the transmission of GOOSE messages beyond the network limits of one substation into the communication network of another substation, the infrastructure of access nodes to the public network can be adapted. As a result, it is possible that also the public network can transmit messages on layer 2 of the OSI reference model. This may be realized for example as in the specification "IEC 61850 GOOSE over WiMax for fast isolation and restoration of faults in distribution networks".

In IEC 61850-90-5, it is proposed to handle GOOSE messages via IP multicast and UDP. This is also known as "Routable GOOSE".

A further alternative would be to set up layer-2 tunnels in the access nodes to the public network, that is to say the routers of the public network.

A disadvantage of the solution possibilities proposed above is on the one hand that modified hardware is required at the access points to the public network. On the other hand, the configuration of the individual energy automation components is laborious.

SUMMARY

One embodiment provides a method for transmitting messages according to the standard IEC 61850 in an energy automation network which comprises a number of substations, wherein each of the substations comprises at least one energy automation component and a communication network via which the at least one energy automation component can exchange messages according to a first communication protocol; the communication networks of the substations are connected to one another for exchanging messages via a public network based on a second communication protocol, in particular the Internet protocol, without multicast support; each of the energy automation components comprises at least one application for controlling it, wherein messages can be exchanged according to the standard IEC 61850 between applications that belong to a group and are arranged in energy automation components of at least two substations; each of the energy automation components comprises a communication unit which is designed for processing messages according to the standard IEC 61850, wherein a message is sent according to the standard IEC 61850 by a first application of a sending energy automation component, the first application belonging to a particular group of applications; the message is received by the communication unit of the sending energy automation component, processed and transmitted via the communication network of the substation in which the sending energy automation component is arranged and/or the public network to at least one second application of the same group; the message is received by the communication unit of the receiving energy automation component comprising a respective second application, processed and forwarded to the assigned second application.

In one embodiment, the communication means of a respective energy automation component are configured by generating for each application contained in the energy automation component concerned as a first application an item of information which comprises a respective item of address information of the receiving energy automation components for the same group to which the second application concerned belongs.

In one embodiment, the generated information is a forwarding table.

In one embodiment, the generation of the information is performed by a central computer simultaneously for all of the energy automation components before the energy automation network is put into operation.

In one embodiment, the generation of the information, in particular in the course of the operation of the energy automation network, is performed in response to receiving a request message from one of the energy automation components.

In one embodiment, the information is provided in an SCL configuration file.

In one embodiment, the information includes static IP addresses of the receiving energy automation components.

In one embodiment, the information of each energy automation component can be changed at the running time of the energy automation network.

In one embodiment, for transmitting the message from the sending energy transmission component by means of the items of address information of the receiving energy automation components, a tunnel to the receiving energy automation components is set up via the public network.

In one embodiment, according to IEC 61850, the messages are encapsulated by the communication unit of the sending energy transmission component in messages of the public network according to the Internet protocol.

In one embodiment, the sending energy transmission component sends the message to be sent n times, n corresponding to the number of receiving energy automation components that are assigned to the sending first application in the information.

In one embodiment, the sending energy automation component sends the message to be sent once, a first receiving energy automation component forwarding this message to another, second receiving energy automation component.

In one embodiment, each energy automation component receiving a message forwards the received message as multicast in the communication network of the substation in which it is arranged.

Another embodiment provides an energy automation component for a substation, comprising: at least one application for controlling it, each application being set up for processing messages according to the standard IEC 61850 and belonging to a group of applications that are arranged in corresponding energy automation components of at least two substations; and a communication unit configured to process messages according to the standard IEC 61850 and encapsulate these in messages of a public network that is based on the Internet protocol and does not support multicast.

In one embodiment, the energy automation component comprises an item of information or can access said item of information which comprises a respective item of address information of receiving energy automation components for the same group to which the application concerned of the energy automation component belongs.

In one embodiment, the communication unit of a sending energy automation component is designed to set up a tunnel to the receiving energy automation components for which an item of address information is stored.

Another embodiment provides a substation for an energy automation network, comprising at least one energy automation component as disclosed above.

BRIEF DESCRIPTION OF THE DRAWING

Example aspects of the invention are explained in more detail below with reference to FIG. 1, which shows a schematic representation of an energy automation network with energy automation components in multiple substations, according to an example embodiment.

DETAILED DESCRIPTION

Embodiments of the present invention provide a method for transmitting messages according to the standard IEC 61850 (GOOSE) in an energy automation network that can be realized in an easier way and in particular without hardware modifications. Other embodiments provide an energy automation component suitable for this and also a correspondingly set up substation.

Some embodiments provide a method for transmitting messages according to the standard IEC 61850 (GOOSE) in an energy automation network which comprises a number of substations is proposed. Each of the substations comprises at least one energy automation component and a communication network, via which the at least one energy automation component can exchange messages according to a first communication protocol. The first communication protocol is in particular the Ethernet. Generally, the first communication protocol may be any protocol based on layer 2 of the OSI reference model.

The communication networks of the substations are connected to one another for exchanging messages via a public network based on a second communication protocol, in particular the Internet protocol, without multicast support. The public network may for example be the Internet or a global company, industry or utility network.

Each of the energy automation components comprises at least one application for controlling it. Messages can be exchanged according to the standard IEC 61850 (GOOSE) between applications that belong to a group and are arranged in energy automation components of at least two substations.

Each of the energy automation components comprises a communication means which is designed for processing messages according to the standard IEC 61850 (GOOSE). The communication means may be realized in software or hardware. It may be regarded as a virtual switch.

In the method, a message is sent according to the standard IEC 61850 by a first application of a sending energy automation component, the first application belonging to a particular group of applications. The message is received by the communication means of the sending energy automation component, processed and transmitted via the communication network of the substation in which the sending energy automation component is arranged and/or the public network to at least one second application of the same group. The message is received by the communication means of the receiving energy automation component comprising a respective second application, processed and forwarded to the assigned second application.

The method makes it possible to transmit messages of an application that uses layer 2 of the OSI reference model, such as for example GOOSE, via a layer-3 unicast network, whereby GOOSE messages can also be transmitted in distributed IP networks without layer-3 multicast support. In particular, an end-to-end layer-2 infrastructure via a public network (i.e. a WAN) is not required.

By contrast with a layer-2 VPN network, which would be provided by an access node of the public network, the proposed method realizes a specific application network in which messages are distributed according to the first communication protocol. The specific application network is also referred to in this description as the "overlay network". GOOSE messages can thus be transmitted to predefined receivers, irrespective of whether they are in the same network as the sender or in another network that is separated by an IP network without multicast support.

A further advantage is that the configuration required for the transmission can be carried out directly on or in the energy automation component. As a result, it is not necessary to perform hardware modifications, in particular to components of the public network. As a result, consequently no special requirements are imposed on the public network connecting the substations for data transmitting purposes.

In some embodiments, the communication means of a respective energy automation component are configured by generating for each application contained in the energy automation component concerned as a first application an item of information which comprises a respective item of address information of the receiving energy automation components for the same group to which the second application concerned belongs. In other words, a configuration of the addresses of other energy automation components that are intended to receive a GOOSE message to be sent is performed.

The generated information may be a forwarding table. The information may for example be stored in the communication means. The information may also be stored in a memory of the energy automation component. It goes without saying that, for each application of an energy automation component, an assigned item of information or forwarding table is configured and stored.

The generation of the information may be performed by a central computer simultaneously for all of the energy automation components before the energy automation network is put into operation. For example, the information may be transmitted from the central computer to all of the energy automation components of the energy automation network.

Alternatively, the generation of the information, in particular in the course of the operation of the energy automation network, may be performed in response to receiving a request message from one of the energy automation components. In this respect, when for example a GOOSE message is received by the communication means of an energy automation component comprising an application sending a GOOSE message, in the event that there is no information in the communication means the request message may be passed on to the central computer. The central computer then creates a corresponding item of information and transmits this to the communication means or the energy automation component from which the request message originates. This procedure is expedient if for example a new energy automation component is added to the network of a substation.

The information assigned to a respective application may be specified and provided in an SCL (System Configuration description Language) configuration file.

The information may include static IP addresses of the receiving energy automation component. This is expedient for example whenever static IP addresses can be used in the public network. The configuration of the communication connections between a sending energy automation component and one or more receiving energy automation components may take place in a way analogous to in the substation.

The information of each energy automation component can be changed at the running time of the energy automation network. This is because the configuration data are not contained in a component of the public network but in the energy automation components, which are under the control and access of an operator of the energy automation network.

For transmitting the message from the sending energy transmission component by means of the items of address information of the receiving energy automation components, a tunnel to the receiving energy automation component or components may be set up via the public network. The aforementioned "overlay network" for the transmission of GOOSE messages via a public network without multicast support is made possible by the tunnel or tunnels.

According to IEC 61850, the messages may be encapsulated by the communication means of the sending energy transmission component in messages of the public network according to the Internet protocol.

The transmission of a GOOSE message to be sent to all of the receivers may be performed in various ways. In a first variant, the sending energy transmission component sends the message to be sent n times, n corresponding to the number of receiving energy automation components that are assigned to the sending first application in the information. In this case, the communication means tunnels the GOOSE message to be sent n times to all n receivers, i.e. energy automation components, contained in the information.

In an alternative, the sending energy automation component sends the message to be sent once, a first receiving energy automation component forwarding this message to another, second receiving energy automation component. This forwarding is repeated according to the number of receivers, until all the receivers have received the message. In this case, each receiver, i.e. each receiving energy automation component, behaves as what is known as a peer in a peer-to-peer (P2P) network and forwards the message to other receivers, i.e. energy automation components. This has the consequence that the sending energy automation component need not send the GOOSE message n times, but just a single time, to a receiving energy automation component, which then forwards the message. The forwarding can be optimized in such a way that the message follows a path according to the communication architecture, and consequently low latencies occur. This is expedient for example when the energy transmission network is realized as a ring. The GOOSE message can then be transmitted along the ring "hop by hop".

In a further embodiment, each energy automation component receiving a message forwards the received message as multicast in the communication network of the substation in which it is arranged.

Some embodiments provide an energy automation component for a substation is proposed. The energy automation component comprises at least one application for controlling it, each application being set up for processing messages according to the standard IEC 61850 and belonging to a group of applications that are arranged in corresponding energy automation components of at least two substations. The energy automation component also comprises a communication means, which is designed for processing messages according to the standard IEC 61850 and can encapsulate these in messages of a public network that is based on the Internet protocol and does not support multicast.

The energy automation component may have the same advantages as described above in conjunction with the method according to the invention.

In one embodiment, the energy automation component may comprise an item of information or access said item of information which comprises a respective item of address information of receiving energy automation components for the same group to which the application concerned of the energy automation component belongs.

The communication means of a sending energy automation component may be designed to set up a tunnel to the receiving energy automation components for which an item of address information is stored.

Other embodiments provide a substation for an energy automation network which comprises at least one energy automation component of the type described above is proposed.

FIG. 1 shows a schematic representation of an energy automation network 1. The energy automation network 1 comprises by way of example three substations 100, 200 and 300. The substations 100, 200, 300 are arranged spatially separate from one another. The substations, which are also referred to as transformer substations, are part of an electrical supply network and serve for connecting different voltage levels. In a way known to a person skilled in the art, substations comprise not only power transformers but also switching installations and measuring and control equipment.

The components required for connecting different voltage levels are of lesser importance for understanding the invention. Since a person skilled in the art knows the components and interconnections that are necessary for this, a detailed description is not provided at this point. In the description that follows, only the communication components that are required for controlling the energy automation network 1 are discussed.

For this purpose, each of the substations 100, 200, 300 comprises one or more energy automation components and a communication network, via which the respective energy automation components of a substation can exchange messages.

Merely by way of example, the substation 100 comprises three energy automation components 110, 120, 130. The communication network connecting the energy automation components 110, 120, 130 for exchanging messages is not explicitly represented. The communication network is based on the Ethernet, so that messages are exchanged on layer 2 of the OSI reference model.

Each of the energy automation components 110, 120, 130 has a number of applications. By way of example, a single application 112 is provided on the energy automation component 110. By way of example, two applications 122, 123 are provided on the energy automation component 120. By way of example, a single application 132 is provided on the energy automation component 130.

In a corresponding way, merely by way of example, the substation 200 has a single energy automation component 210. Once again merely by way of example, two applications 212, 213 are arranged on the energy automation component 210.

Merely for purposes of illustration, the substation 300 comprises two energy automation components 310, 320. Each of the energy automation components 310, 320 comprises two applications. Two applications 312, 313 are arranged on the energy automation component 310. Likewise, two applications 322, 323 are arranged on the energy automation component 320.

For the sake of simplicity, also not explicitly represented are respective communication networks for the substations 200, 300, which allow communication of the energy automation components contained in a respective substation 200, 300 with one another.

A transmission of messages between the energy automation components themselves is based on the standard IEC 61850 (GOOSE), a real-time network protocol for controlling the energy automation components via the Ethernet communication network (Ethernet network or Ethernet for short), to which they are connected. According to the specification, GOOSE sends messages concerning the state of an energy automation component regularly at fixed intervals. The messages are received and processed by other energy automation components, which possibly likewise leads to a change in state of the receiving energy automation components.

Since the switching state or a change in state of an energy automation component of a substation under some circumstances is of significance not only for another automation component of the same substation but also for energy automation components of one or more other substations, the communication networks of the respective substations 100, 200, 300 are connected to one another for exchanging messages via a public network based on the Internet protocol without multicast support. The connection of the communication networks of the substations 100, 200, 300 takes place via network nodes 410, 420, 430 assigned to the substations, for example routers. Consequently, it is possible for example for an energy automation component of the substation 100 to exchange messages with an energy automation component in the substations 200 or 300.

For technical reasons and/or reasons of cost, the transmission of messages within the public network 400, which for example represents the Internet or a global network, generally takes place on layer 3 of the OSI reference model. This means that, if a message is to be transmitted from a first communication node of the public network 400 to a second communication node of the public network 400, a route and an end-to-end connection are created for this purpose. This routing takes place on layer 3 of the OSI reference model. Since this inherently does not support multicast, which is required for the use of messages sent by means of GOOSE, a procedure that allows a layer-2 message transmission also in distributed routing networks without having to require the precondition of an end-to-end layer-2 infrastructure via the public network 400 is proposed.

For this purpose, all of the energy automation components 110, 120, 130, 210, 310, 320 have a communication means 111, 121 131, 211, 311, 321 assigned to them. As a result of these communication means, it is not necessary to use special network components in the public network 400. The necessary network intelligence is realized by the communication means 111, 121 131, 211, 311, 321 in the form of a virtual switch on the assigned energy automation component 110, 120, 130, 210, 310, 320 itself. This may be realized for example by means of Open vSwitch.

The communication means 111, 121, 131, 211, 311, 321 assume the functions of a tunnel setup between virtualized switches (communication means), the identification of GOOSE messages and the forwarding of GOOSE messages via a corresponding tunnel interface. Various encapsulation protocols may be used for the tunnel. For example, the "Stateless Transport Tunneling Protocol for Network Virtualization (STT)" may be used for this.

The configuration of the communication means 111, 121, 131, 211, 311, 321, which can take the form of software or hardware, may be realized by a central computer 500. The central computer 500 comprises for this purpose an engineering tool 510 and what is known as an SDN (Software Defined Networking) controller 520. By means of the engineering tool 510, a configuration of the energy automation components 110, 120, 130, 210, 310, 320 of all of the substations 100, 200, 300 is performed. In the course of the configuration, a parameterization of all of the energy automation components takes place. This means that it is established which energy automation components logically belong together. The logical association is produced by the assignment of a respective application of the energy automation components to a respective group.

In the exemplary embodiment of FIG. 1, three logical groups 10, 20, 30 are provided. Thus, by way of example, the application 112 of the automation component 110, the application 122 of the energy automation component 120, the application 212 of the energy automation component 210 and the application 312 of the energy automation component 310 belong to a first group 10 of applications. The application 123 of the energy automation component 120, the application 213 of the energy automation component 210, the application 313 of the energy automation component 310 and the application 322 of the energy automation component 320 belong to a second group 20 of applications. The application 132 of the energy automation component 130 and the application 322 of the energy automation component 320 are assigned to a third group 30 of applications.

The logical grouping of the applications in connection with the communication means assigned to a respective energy automation component has the consequence that, for example when a GOOSE message is sent by the application 122 (sending application AS) of the first group 10, the GOOSE message is transmitted via a logical communication network 1000 assigned to the first group 10 only to the energy automation components 110, 210 and 310 (receiving energy automation components EAE1, EAE2, EAE3) that comprise applications 112, 212, 312 (receiving applications AE1, AE2, AE3) belonging to the first group 10. Although the GOOSE message is sent by the energy automation component 120, or its communication means 121, according to the GOOSE specification as multicast, this has the consequence that the energy automation component 130, which does not comprise any application belonging to the first group 10 of applications, does not receive this GOOSE message. As a result, the communication network of the substation 100 is freed of unnecessary communication.

For each of the further logical groupings of applications, i.e. each of the groups 20, 30, an own logical communication network 2000, 3000 is produced in the way described above.

The configuration and parameterization of the energy automation components 110, 120, 130, 210, 310, 320 and the accompanying communication connections between the individual energy automation components are specified in a planning phase, for example according to IEC 61850 in what is known as the Substation Configuration Language (SCL). For example, if they are supported by the public network 400, static IP addresses can be used for the configuration of the communication means 111, 121, 131, 211, 311, 321. In this case, a communication connection is configured between each possible transmitting energy automation component and each assigned receiving energy automation component according to the logical grouping. The applications concerned are provided with the configuration specified in the SCL. In the communication means, the tunnels are for example manually configured and corresponding forwarding rules are defined. The engineering tool 510 stores and manages corresponding SCL configuration files and can transfer these files or parts thereof to corresponding network components.

Alternatively, a centralized configuration of the communication means 111, 121, 131, 211, 311, 321 may take place. This configuration is performed by the SDN controller 520 of the central computer. The SDN controller 520 can configure and activate the tunnels between the individual communication means. For this purpose, forwarding tables are configured in the communication means. Such a forwarding table is configured for each application 111, 121, 131, 211, 311, 312 of the energy automation components 110, 120, 130, 210, 310, 320.

It is assumed for example that the application 122 of the energy automation component 120 is a sending application AS and the energy automation component 120 is a sending energy automation component EAS. The application 122 belongs to the first group 10 of applications. Therefore, the addresses of all the remaining applications that belong to the first group 10 of applications are stored in the forwarding table for the application 122. In this example, the application 112 represents a receiving application AE1, the application 212 represents a receiving application AE2 and the application 312 represents a receiving application AE3. The receiving application AE1 is arranged on the energy automation component 110, so that its address is stored in the forwarding table. The receiving applications AE2 and AE3 are contained in the energy automation component 210 and 310, respectively (EAE2 and EAE3), so that their addresses are stored in the forwarding table. This procedure is carried out correspondingly for all further applications that can be sending applications. This type of configuration of the forwarding tables may be proactive, i.e. take place initially before the energy automation network 1 is put into operation.

Alternatively, the configuration may also take place reactively. In this case, for example a GOOSE message from the sending application AS (application 122 on the energy automation component 120) is received by the communication means 121. The communication means 121 checks whether there is a forwarding table for the group 10 of applications. If there is no entry in the forwarding table of the communication means 121, the communication means 121 contacts the central computer 500 or the SDN controller 520. This creates a forwarding entry or a forwarding table and transmits this entry or table to the communication means 121, so that then there is a forwarding table. This is then used for the communication connections to be created.

The SDN controller 520 may be realized as a component of the engineering tool 510 or separately from it.

This method closely links the network configuration with the automation function of GOOSE, and thereby makes easy administration of the entire energy automation network possible.

The sequence of the transmission of GOOSE messages between energy automation components 110, 120, 130, 210, 310, 320 arranged in different substations 100, 200, 300 is as follows. It is once again assumed here that the application 122 as a sending application AS would like to send a GOOSE message, which is to be transmitted to the applications 112, 212, 312 belonging to their group 10 of applications as receiving applications AE1, AE2, AE3.

The application 122 as a sending application AS sends a GOOSE message according to IEC 61850 in a communication network of the substation 100. The communication means 121 (i.e. the virtual switch) of the sending energy automation component EAS receives the GOOSE message from the communication network. As described above, a forwarding table that contains the respective target entries for the GOOSE message of the receiving energy automation components 110, 210, 310 (EAE1, EAE2, EAE3) has been produced in the communication means 121. Tunnels to each of the energy automation components 110, 210, 310 have already been set up and thus form an overlay network dedicated to this GOOSE service. The interface or interfaces on which the GOOSE message is forwarded is or are determined from the forwarding table. This should be understood as meaning the next hop to which the GOOSE message is to be transferred. This could be for example the router 410 of the public network 400 in FIG. 1. Depending on the tunnel mechanism, the GOOSE messages are encapsulated by the communication means 121, for example in IP unicast packets, and transmitted via the public network.

In an alternative, the communication means 121 may send the GOOSE message n times, i.e. in the present case three times, one after the other to the receiving energy automation components 110, 210, 310 specified in the forwarding table. Generally, n is the number of receivers of the GOOSE message that are contained in the forwarding table.

In another embodiment, the receiving energy automation components EAE1, EAE2, EAE3 behave as peers in a P2P network and forward the GOOSE message to another receiving energy automation component. For example, the receiving energy automation component EAE1 receives the GOOSE message from the sending energy automation component EAS and forwards the message itself to the receiving energy automation component EAE2. The receiving energy automation component EAE2 then forwards the GOOSE message to the receiving energy automation component EAE3.

The sending energy automation component EAS, or its communication means 121, consequently only has to send the message a single time. This forwarding mechanism can be optimized in such a way that it follows, for example, the communication architecture, whereby low latencies occur. For example, GOOSE is used for FLISR in a distribution network. Medium-voltage or low-voltage networks are typically realized in the form of a ring. Powerline Communication (PLC) is used as the communication technology. The GOOSE application multicast service is then configured in such a way that the GOOSE message is transmitted along the ring hop by hop.

The message is received by the respective communication means 111, 211, 311 of the receiving communication component EAE1, EAE2, EAE3. The communication means forwards the message in the respective communication network of the substation as Ethernet multicast. Alternatively, the GOOSE receiver may also be directly the corresponding energy automation component. Within the energy automation component EAE1, EAE2, EAE3, the message is forwarded to the application AE1, AE2, AE3 belonging to the first group of applications, which then processes it.

By contrast with a layer-2 VPN, which requires a configuration of the VPN (Virtual Private Network) in a router of the public network, the proposed method realizes the GOOSE-specific application overlay network. This means that only GOOSE messages are distributed in this overlay network. The GOOSE messages are only sent to receiving energy automation components that are specified in the corresponding system configuration.

The procedure has the advantage that a central configuration is possible. Furthermore, no interventions in the software or hardware of components of the public network 400 are required.

What is claimed is:

1. A method for transmitting messages according to the standard IEC 61850 in an energy automation network including a number of substations, wherein
    each of the substations comprises at least one energy automation component and a communication network via which the at least one energy automation component can exchange messages according to a first communication protocol;
    the communication networks of the substations are connected to one another for exchanging messages via a public network based on a second communication protocol without multicast support;
    each of the energy automation components comprises at least one application configured to control the respective energy automation component, wherein messages are exchangeable according to the standard IEC 61850 between applications that belong to a common group and are arranged in energy automation components of at least two substations; and
    each of the energy automation components comprises a communication unit configured to process messages according to the standard IEC 61850,
    wherein the method comprises:
        transmitting a message according to the standard IEC 61850 by a first application of a sending energy automation component;
        receiving the message by the communication unit of the sending energy automation component,
        processing and transmitting the received message, via at least one of (a) the communication network of the substation in which the sending energy automation component is arranged or (b) the public network to at least one receiving second application;
        receiving the message by the communication unit of a receiving energy automation component comprising a respective receiving second application;
        processing and forwarding the received message, by the communication unit of each receiving energy automation component, to the respective receiving second application;
        wherein the first application belongs to a particular group of applications, and the at least one second application belongs to the same particular group;
        wherein the communication units of a respective energy automation component are configured by generating, for each application in the energy automation component, an item of information including a respective item of address information each receiving energy automation component in the same group as the respective application; and
        wherein, for transmitting the message from the sending energy transmission component using the items of address information of the receiving energy automation components, a tunnel to the receiving energy automation components is set up via the public network.

2. The method of claim 1, wherein the generated information is a forwarding table.

3. The method of claim 1, comprising generating the information by a central computer simultaneously for all energy automation components before the energy automation network is put into operation.

4. The method of claim 1, comprising generating the information, in the course of operation of the energy automation network, in response to receiving a request message from one of the energy automation components.

5. The method of claim 1, wherein the information is provided in an SCL configuration file.

6. The method of claim 1, wherein the information includes static IP addresses of the receiving energy automation components.

7. The method of claim 1, wherein the information of each energy automation component is changeable at a run time of the energy automation network.

8. The method of claim 1, wherein, according to IEC 61850, the messages are encapsulated by the communication unit of the sending energy transmission component in messages of the public network according to the Internet protocol.

9. The method of claim 1, comprising sending the message n times by the sending energy transmission component, wherein n corresponds to the number of receiving energy automation components that are assigned to the sending first application in the information.

10. The method of claim 1, wherein:
the sending energy automation component sends the message to be sent once, and
a first receiving energy automation component forwarding this message to another, second receiving energy automation component.

11. The method of claim 1, wherein each energy automation component that receives a message forwards the received message as multicast in the communication network of the substation in which the respective energy automation component is arranged.

12. The method of claim 1, wherein the second communication protocol is an Internet protocol.

13. An energy automation component for a substation, the energy automation component comprising:
at least one application configured to control the energy automation component,
wherein each application is configured to process messages according to the standard IEC 61850;
a communication unit configured to process messages according to the standard IEC 61850 and encapsulate the messages in messages of a public network that is based on an Internet protocol;
wherein each application belongs to a group of applications that are arranged in corresponding energy automation components of at least two substations;
each energy automation component comprises or has access to an item of information that comprises a respective item of address information of receiving energy automation components for the same group to which the application concerned of the energy automation component belongs; and
the communication unit of a sending energy automation component is configured to set up a tunnel to the receiving energy automation components for which an item of address information is stored.

14. A substation for an energy automation network, the substation comprising:
at least one energy automation component, each comprising:
at least one application configured to control the energy automation component,
wherein each application is configured to process messages according to the standard IEC 61850;
a communication unit configured to process messages according to the standard IEC 61850 and encapsulate the messages in messages of a public network that is based on an Internet protocol;
wherein each application belongs to a group of applications that are arranged in corresponding energy automation components of at least two substations;
each energy automation component comprises or has access to an item of information that comprises a respective item of address information of receiving energy automation components for the same group to which the application concerned of the energy automation component belongs; and
the communication unit of a sending energy automation component is configured to set up a tunnel to the receiving energy automation components for which an item of address information is stored.

\* \* \* \* \*